United States Patent [19]

Takehara

[11] Patent Number: 4,542,493

[45] Date of Patent: Sep. 17, 1985

[54] PICKUP STYLUS HAVING FUSED DIAMOND AND CERAMIC BODIES WITH CONDUCTIVE SURFACES FOR CAPACITANCE DISK RECORDS

[75] Inventor: Hideaki Takehara, Fujisawa, Japan

[73] Assignee: Victor Company of Japan, Limited, Yokohama, Japan

[21] Appl. No.: 327,672

[22] Filed: Dec. 4, 1981

[30] Foreign Application Priority Data

Dec. 5, 1980 [JP] Japan .................. 55-171828

[51] Int. Cl.$^4$ .................. G11B 9/06; G11B 11/00
[52] U.S. Cl. .................. 369/126; 369/173
[58] Field of Search .................. 369/126, 173

[56] References Cited

U.S. PATENT DOCUMENTS

| | | | |
|---|---|---|---|
| 2,992,007 | 7/1961 | Bondley | 369/173 |
| 3,813,101 | 5/1974 | Benz | 369/173 |
| 4,052,738 | 10/1977 | Hosomi et al. | 369/126 |
| 4,105,213 | 8/1978 | Owaki et al. | 369/173 |
| 4,340,954 | 7/1982 | Chio et al. | 369/173 |
| 4,357,699 | 11/1982 | Takehara et al. | 369/126 X |
| 4,420,675 | 12/1983 | Takehara | 369/173 X |

FOREIGN PATENT DOCUMENTS

| | | | |
|---|---|---|---|
| 0041881 | 12/1979 | Japan | 369/173 |
| 0041882 | 12/1979 | Japan | 369/173 |

*Primary Examiner*—Aristotelis M. Psitos

[57] ABSTRACT

An oxidation resistant soldering compound is deposited in a bore formed on an end of a ceramic shank. A diamond grain is placed in the bore of the shank and heated at an elevated temperature in a vacuum to solder the diamond with the ceramic shank. The soldered diamond and ceramic body are lapped into the shape of a stylus. The stylus is subsequently placed in an environment containing a small amount of oxygen and heated at a temperature lower than the solidus temperature of the soldering compound to convert the surface area of the diamond into a conductive layer of carbon which is lapped into an elongated form to serve as a stylus electrode.

6 Claims, 6 Drawing Figures

PICKUP STYLUS HAVING FUSED DIAMOND AND CERAMIC BODIES WITH CONDUCTIVE SURFACES FOR CAPACITANCE DISK RECORDS

BACKGROUND OF THE INVENTION

The present invention relates to a pickup stylus body for capacitance disk records and a method for making such stylus bodies.

Pickup styluses for use with capacitance disk records comprises diamond body and an electrode attached thereto which senses the geometric surface variations of the record as capacitance variations. The electrode is conventionally formed by vacuum deposition, sputtering, or ion plating a conductive material such as hafnium or titanium. Since such conductive material is chemically different from the underlying material, the electrode is only physically attached to the underlying body, resulting in an electrode having a tendency to separating therefrom during use due to friction with the record surface.

Copending U.S. patent application No. 268,888 filed June 1, 1981 (now U.S. Pat. No. 4,409,712) assigned to the same assignee as the present invention discloses a method for making a stylus for capacitance disk records. The disclosed method involves placing a diamond body in a virtually vacuum or inert gas containing a small amount of oxygen and heating the diamond at an elevated temperature so that the carbon atoms of the surface area are converted to a layer of conductive carbon. The conductive layer is subsequently lapped into an elongate form so that it extends to the stylus's contact face to serve as a pickup electrode. Since the conductive carbon layer is integral with the diamond body, the electrode is not separable therefrom and resistant to wear.

Conventionally, the diamond body is placed on an end of a titanium body with a silver paste deposited therebetween and heated in a vacuum at an elevated temperature to fuse the silver paste for soldering the diamond and titanium bodies. However, the application of heat in the presence of small amount of oxygen during the subsequent diamond's surface conversion causes the titanium body to oxidize and causes the silver paste to melt, resulting in styluses unsuitable for satisfactory operation. Alternatively, use of a single body of diamond as large as 1 mm in length could eliminate this problem. However, the diamond of this size is only available naturally at a prohibitively high cost.

SUMMARY OF THE INVENTION

According to the present invention, there is provided a method for making a pickup stylus for capacitance disk records, wherein the stylus includes a layer of conductive carbon which is formed on a surface of a diamond body at an elevated temperature in an environment containing a small amount of oxygen. The method comprises the steps of forming a bore on a surface of a ceramic body, depositing an oxidation resistant soldering material into the bore, the soldering material having a solidus temperature higher than the temperature at which the conductive carbon layer is formed, placing a diamond body in the bore, heating the bodies in a vacuum to fuse the soldering material to solder the bodies together, and lapping the soldered bodies to form a stylus body. This stylus body is subsequently placed in an environment containing a small amount of oxygen and heated at a temperature which is lower than the solidus temperature of the soldering material so that the carbon atoms of the surface area of the diamond are converted to a conductive layer which is later lapped into a narrow strip to serve as a stylus electrode for detecting capacitance variations.

Preferably, the soldering material comprises a compound of gold and platinum or a compound of gold and paradium. The constituents of each compound are proportioned so that the compound acquires a solidus temperature higher than the temperature at which the diamond surface is converted into a conductive state.

BRIEF DESCRIPTION OF THE DRAWINGS

The present invention will be described in further detail with reference to the accompanying drawings, in which.

DETAILED DESCRIPTION

Figure 1A:
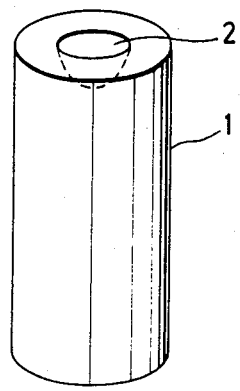
FIGS. 1a and 1b are perspective views of ceramic bodies or shanks having different shapes of bore.
Figure 2A:
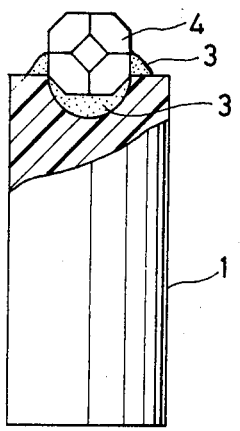
FIGS. 2a and 2b are side views of the ceramic bodies each having a diamond body in their bores.
Figure 3:
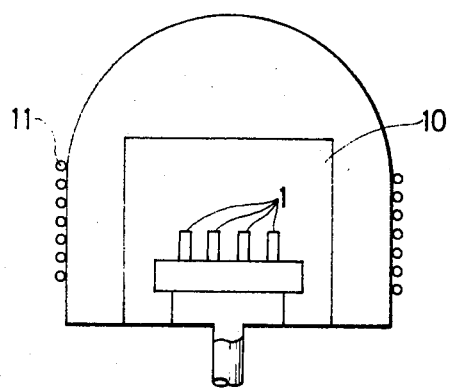
FIG. 3 is a schematic illustration of a high frequency furnace.
Figure 4:
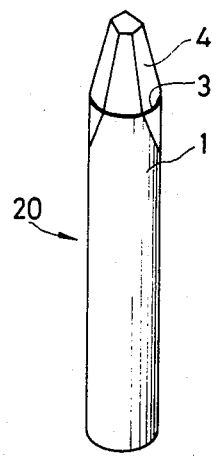
FIG. 4 is a perspective view of a stylus body after the soldered diamond and ceramic bodies are lapped.

According to the present invention, the pickup stylus for capacitance disk records comprises a ceramic shank and a diamond body which is attached to the shank by soldering a gold paste. FIG. 1a illustrates a ceramic shank 1 formed with a semispherical bore 2 on one end face thereof. Into the bore 2 is deposited a charge of gold solding particles 3 which comprise a compound of gold and paradium or a compound of gold and plutinum. A small body or grain of diamond 4 is placed into the bore 2 as illustrated in FIG. 2a. Gold soldering particles are additionally deposited around the diamond body 1. The stylus body is then placed into a high-frequency furnace 10 shown in FIG. 3 which is subsequently evacuated to vacuum. The stylus body is then heated by high frequency current that flows in the coil 11 to a temperature which is 50° C. higher than the liquidus temperature of the gold paste for soldering the diamond body 4 and ceramic shank 1 together. After this soldering process, the stylus is removed from the furnace 10 and subject to a lapping process whereby the stylus is shaped into a desired form 20 as illustrated in FIG. 4, for example.

To render the fused gold paste resistant to heat and oxidation when subject to subsequent process of diamond's surface conversion the gold-paradium compound has a weight percent of 90% to 94% of gold and a weight percent of 10% to 6% of paradium. Preferably, the compound has a gold-to-paradium ratio of 92 : 8 at which its solidus temperature is still higher than the temperature at which the diamond's surface conversion process is conducted while it minimizes the amount of paradium which tends to be oxidized. Similarly, the gold-platinum compound has a weight percent of 65% to 85% of gold and a weight percent of 35% to 15% of plutinum. Preferably, the coumpound has a gold-to-platinum ratio of 75 : 25. The use of gold-platinum compound is preferred to gold-paradium compound due to the platinum's inherent immunity to oxidation.

In a further preferred method, a small amount of titanium is mixed in the gold paste to increase the degree of wetting contact between the surfaces of the diamond and ceramic shank. The amount of the mixed titanium is in a range of 0.5% to 1.0% of the compound.

It is noted that in either gold-paradium or gold-platinum compound the mixture ratio is determined so that the soldering compound has a higher solidus temperature than the temperature at which the surface of the diamond is converted to a layer of conductive carbon, while assuring high resistance to oxidation.

The semispherical bore 2 is suitable for fusing a gold paste having a greater temperature difference between solidus and liquidus curves. The gold-platinum paste has greater solidus-liquidus temperature differences, typically 200 degrees centigrade (1410° C.-1210° C.) for a gold-to-platinum ratio of 75 : 25, than those of the gold-paradium paste, which are typically 50 degrees centigrade (1240° C.-1190° C.) for a gold-to-paradium ratio of 92 : 8. Therefore, the semispherical bore 2 is suited for fusing gold-platinum compound.

Figure 1B:
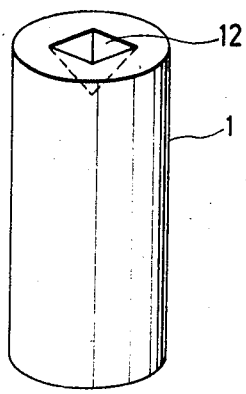
Figure 2B:
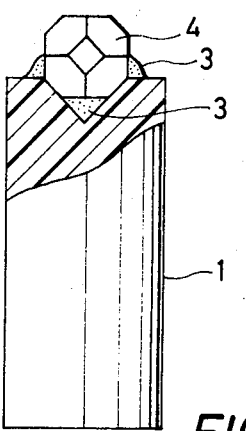

The ceramic shank 1 may be formed with a pyramidal bore 11 as shown in FIG. 1b. The pyramidal bore 11 provides a smaller space between its walls and the diamond 4 as seen from FIG. 2b that creates a capillary action in the fused gold paste. For this reason, pyramidal bore 11 is suited for fusing a gold paste having a relatively small solidus-liquidus temperature difference as exhibited by the gold-paradium compound.

It is found that the shank 1 is preferably composed of a porous ceramic since the porosity provides increased surface adhesion to the gold paste. The surface adhesion could alternatively be provided by vacuum deposition of the gold paste onto the inner surface of the bore.

After the lapping process, the stylus is again placed into the high frequency furnace 10 which is subsequently evacuated to a level in a range from $3 \times 10^{-2}$ Torr and $200 \times 10^{-2}$ Torr so that it contains a small amount of oxygen whose partial pressure ranges from $(3/5) \times 10^{-2}$ Torr to $40 \times 10^{-2}$ Torr which is one-fifth of the total pressure of the furnace. The stylus is heated to a temperature of 1150 degrees centigrade. This heat treatment in the presence of small amount of oxygen converts the carbon atoms of surface area of diamond to a layer of conductive carbon. A further lapping process follows to shape the conductive carbon layer into a narrow strip to serve as the stylus electrode. The diamond's surface conversion can be conducted in an inert gas environment containing oxygen in the amount just described.

Since the gold paste is rendered resistant to heat and oxidation and since the ceramic shank is inherently resistant to heat, the diamond and ceramic shank remain fused together during the surface conversion process.

The soldering method as described above is also effective for subsequent surface conversion process in which the stylus is preheated to a temperature of from 650 degrees to 750 degrees centigrade in the oxygen containing furnace as mentioned above and irradiated with an infrared laser beam. This preheating process serves to bring the surface carbon atoms into a state which is readily convertible to a conductive state and permits the use of a lower energy laser beam.

What is claimed is:

1. A pickup stylus for capacitance disk records comprising:
    a ceramic body having a bore on one end thereof;
    a diamond body having a surface and having a conductive layer of carbon as an integral part of said surface, the diamond body partially extending into said bore; and
    an oxidation resistant soldering material for soldering said bodies together.

2. A pickup stylus as claimed in claim 1, wherein said ceramic body comprises a porous ceramic material.

3. A pickup stylus as claimed in claim 1, wherein said soldering material comprises a compound of gold or a platinum compound of gold and palladium.

4. A pickup stylus as claimed in claim 3, wherein said compound has a weight percent of 65 percent to 85 percent of gold and a weight percent of 35 percent to 15 percent of platinum or a weight percent of 90 percent to 94 percent of gold and a weight percent of 10 percent to 6 percent of palladium.

5. A pickup stylus as claimed in claim 4, wherein said compound has a gold-to-platinum ratio of 75:25 or a gold-to-palladium ratio of 92:8.

6. A pickup stylus as claimed in claim 3, wherein said compound further comprises a small amount of titanium.

* * * * *